United States Patent

Fremont

[15] 3,653,358

[45] Apr. 4, 1972

[54] FLOATING FISH GROWING TANK

[72] Inventor: Howard J. Fremont, New York, N.Y.

[73] Assignee: Marine Protein Corporation, New York, N.Y.

[22] Filed: Apr. 6, 1970

[21] Appl. No.: 25,907

[52] U.S. Cl. ............................................................. 119/3
[51] Int. Cl. ........................................................ A01k 63/00
[58] Field of Search ........................... 119/3, 5; 114/.5 T, 222; 4/171; 43/56

[56] References Cited

UNITED STATES PATENTS

| | | |
|---|---|---|
| 1,054,561 | 2/1913 | Kennedy .................................... 43/56 |
| 471,501 | 3/1892 | Houston et al ............................. 119/3 |
| 1,444,367 | 2/1923 | Brolliar ....................................... 119/5 |
| 2,203,565 | 6/1940 | Field ..................................... 119/3 UX |

*Primary Examiner*—Hugh R. Chamblee
*Attorney*—Kenyon and Kenyon Reilly Carr and Chapin

[57] ABSTRACT

A floating growing tank for fish. Moored Floats support a closed watertight liner filled with water and immersed in a relatively large body of water. A protective mesh surrounds the liner. A plurality of such tanks can be grouped around a service platform to form a system.

8 Claims, 4 Drawing Figures

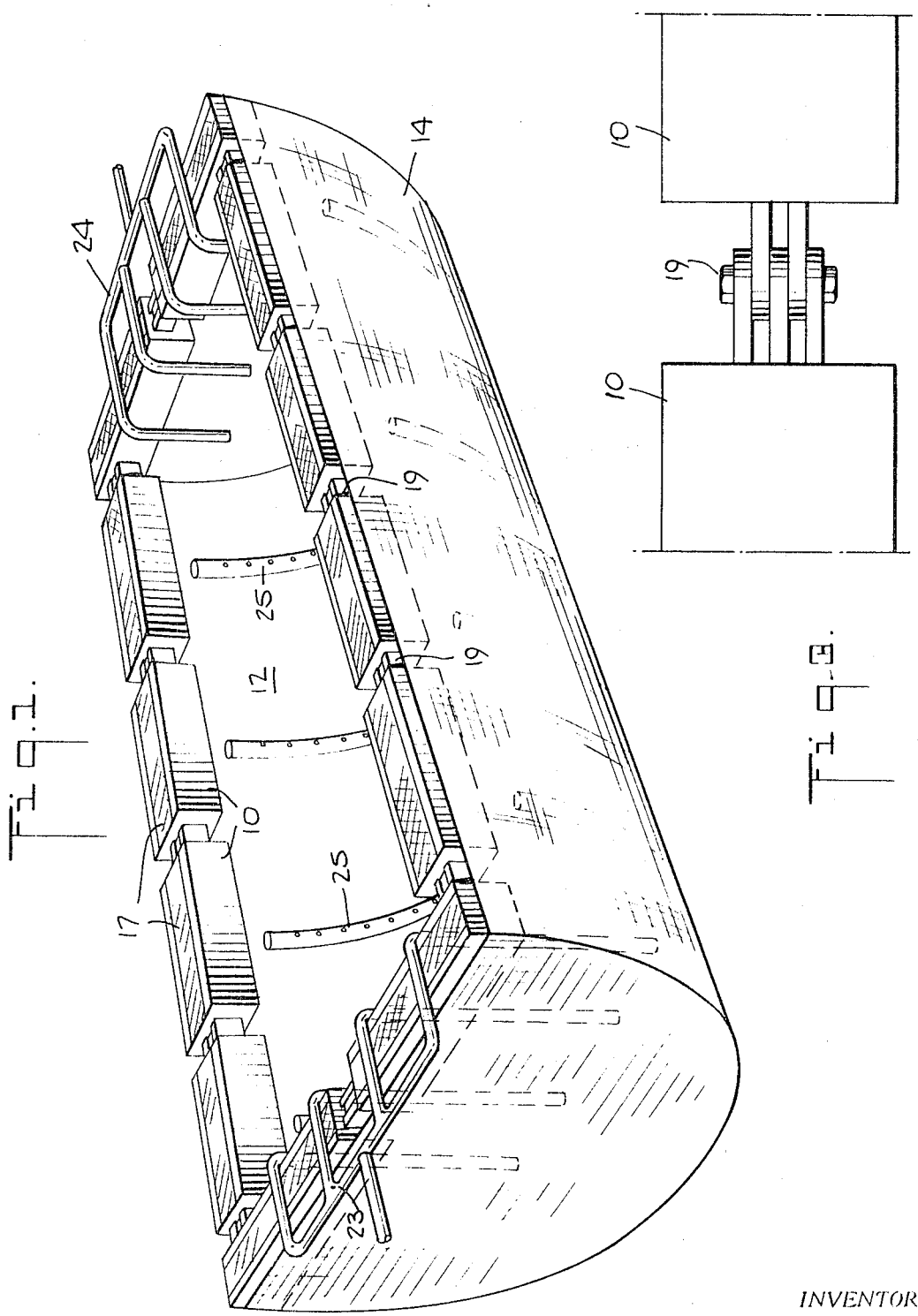

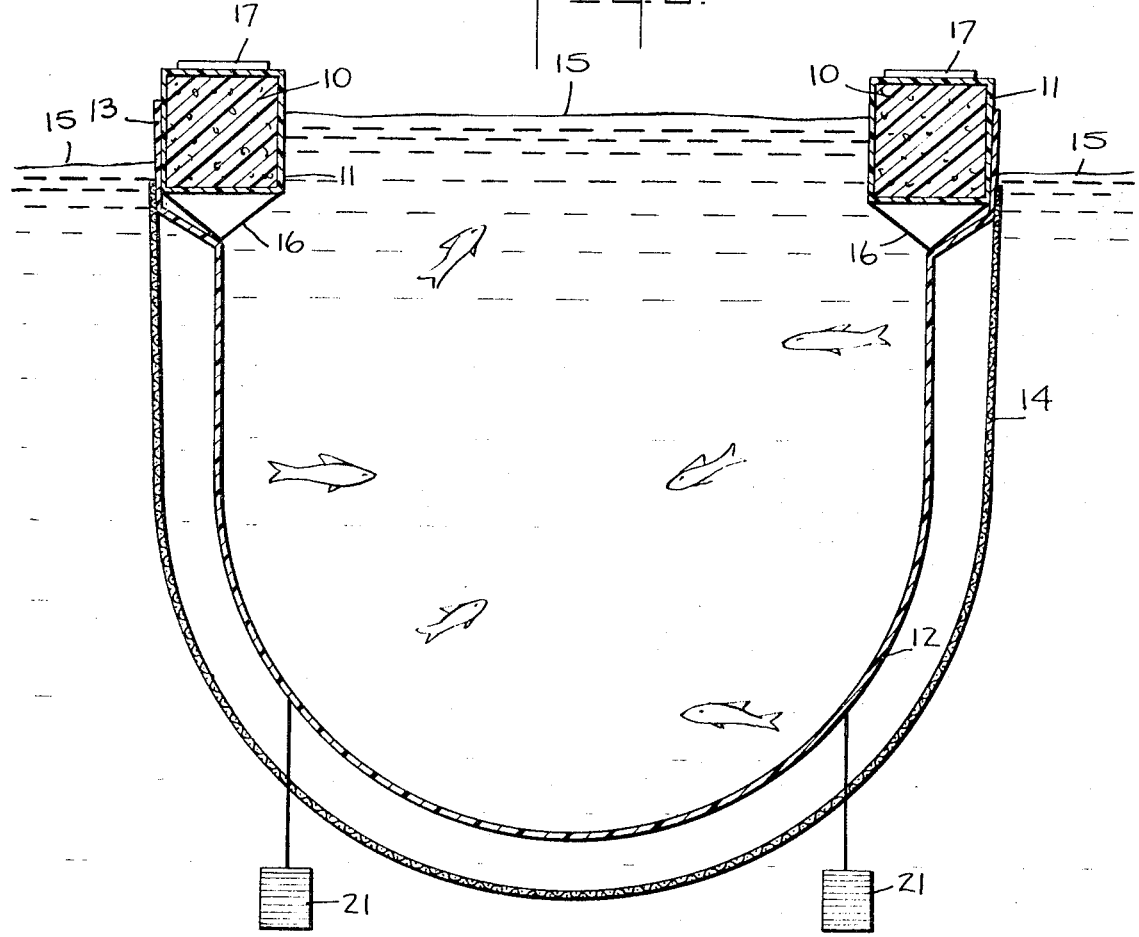
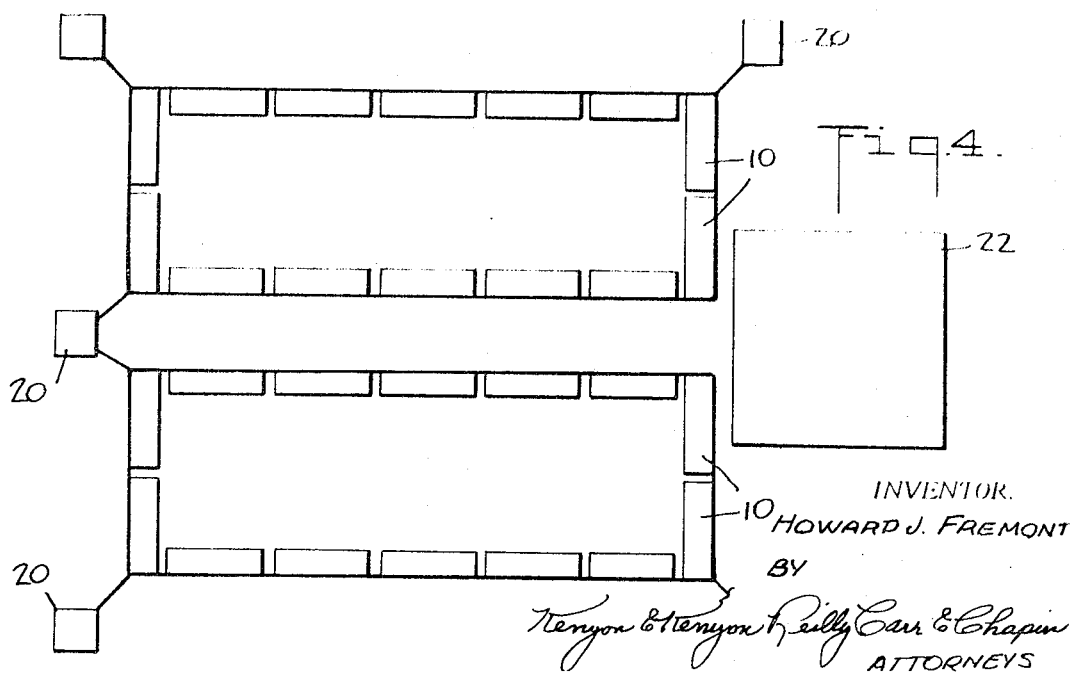

FLOATING FISH GROWING TANK

BACKGROUND OF THE INVENTION

1. Field of the Invention

This invention pertains to the field of fish husbandry and particularly to enclosures providing a controlled environment conducive to rapid growth of fish therein.

2. Description of the Prior Art

Fish growing tanks known to applicant have been positioned in a number of ways.

Some types are constructed above ground. This is an expensive way to build such a tank, because the structures needed to maintain rigid walls and to keep them standing is necessarily substantial.

Another proposed tank structure is one built into the ground, similar to swimming pools. These do not require extensive above-ground structures, but do require excavation, which is also quite expensive.

None of these tanks can easily be moved, or collapsed.

It is an object of this invention to provide a growing tank for fish, which tank can be of very large size and yet require neither incorporation of heavy loadbearing structural members nor excavation in installation.

It is a further object to provide a tank which, while economical and light in weight, is durable as well.

An added object is to provide a tank which is made such that it can be quite large and still remain portable and collapsible.

SUMMARY OF THE INVENTION

The present invention is for a large fish growing tank utilizing a segmented chain of large floats having a flexible liner suspended therefrom. The liner is watertight and, in use in a large body of water, is filled with water. A protective mesh surrounds the flexible liner.

BRIEF DESCRIPTION OF THE DRAWINGS

FIG. 1 is a perspective view of the growing tank.

FIG. 2 is a side cross sectional view of the growing tank.

FIG. 3 is a side view of the connective linkage between two float segments.

FIG. 4 is a top view of a system comprising a number of growing tanks surrounding a floating service platform.

DESCRIPTION OF THE PREFERRED EMBODIMENTS

The growing tank, as shown in FIG. 1, includes a system of large floats 10. A suitable length for each float is about 25 feet and a suitable cross section is about 4 feet square. Floats 10 are made of some highly buoyant noncorrosive material, having low absorption properties with respect to water. Polyurethan foam is one example of similar material. Each float 10 is covered with a waterproof fiberglass "skin" 11, and the top surface of each float bears a non-slip surface 17, enabling a man to walk safely on the float. Floats 10 are joined in a closed flexible chain, by tongue-and-groove assemblies 19 which are locked together by bolts 23, passing through aligned holes in the tongue-and-groove assembly (see FIG. 3).

The system of floats 10 supports a number of cable suspenders 16. Suspended from cables 16 is the liner 12, a large flexible piece of durable watertight material. Liner 12, when hung from floats 10 and filled with water, provides a large dish-shaped enclosure containing a volume of trapped water.

Flaps 13 of liner 12 extend up the sides of floats 10 to a point above the surface 15 of the body of water in which the tank is placed, the purpose being to prevent water from the outside to pass into the tank, and vice versa.

A protector 14, also supported by floats 10, surrounds the liner to prevent damage due to waterborne objects or marine creatures. Protector 14 can be a metal or nylon mesh, for example. It can be positioned outside of the liner, or it can be laminated into the liner itself.

In use, sufficient floats are coupled together to form a tank whose top surface is rectangular and about 100 feet long by 50 feet wide. An appropriate depth for the liner bottom is about 20 feet. Weights 21 are suspended from the bottom of liner 12 to establish tension therein to keep it in an expanded shape. A rigid or semi-rigid frame could also accomplish this purpose.

Several of these tanks can be combined to form a system of fish growing apparatus. FIG. 4 shows such an arrangement. Several tanks are fastened to moorings 20 around a platform 22 which can be any suitable floating object such as a barge, or a permanently fixed platform. Apparatus and stores necessary to service the fish tanks, such as oxygenators, waste removers, food and chemicals, can be permanently maintained thereon.

Tanks such as this are primarily designed to provide controlled environments for the growing of fish at extremely high density, e.g. 6 pounds of fish per cubic foot of water. At these densities, it is absolutely critical to provide for heavy oxygenation of the water. It is also crucial to circulate the water in order that it be treated and/or replaced constantly. This is necessary because fish in such densly packed conditions very quickly contaminate surrounding water with metabolites such as offal, ammonia, and carbon dioxide. With these considerations in mind, the tank of this invention is provided with apparatus to circulate, replace and oxygenate the water therein.

When the tank is in use, input pipes 23, through which treated and filtered water is pumped, extend nearly to the bottom of liner 12, at one end of the tank, to help hold it in shape and to supply clean water to the tank. At the opposite end of the tank, outlet pipes 24 are provided, extending about 5 feet down into the tank, to pump out water for treatment.

Perforated pipes or hoses 25 extend across the floor of the liner; these are hooked up to apparatus to supply oxygen or air to bubble up through the tank via the hoses or pipes.

It is quite easy to harvest fish from a tank such as described. One method is to pull the pipes and hoses from the tank and simply pump the water out. As water is removed, the liner bottom will rise, until the fish are all contained near the surface and are thus very easy to remove with nets. If the pipes can be provided with flexibility, there is no need to remove them during harvesting.

Thus, this invention provides a fish tank which can be enormous in volume, and yet be cheap to build, not requiring heavy structure or excavation. The tank is also movable, and is made of materials which can easily be collapsed for complete dissembly and storage.

I claim:

1. A floating fish growing tank comprising:
   a. a float system;
   b. a water impermeable liner suspended below said float system forming a vessel for holding water;
   c. a protective mesh around the outside of said liner, said mesh being suspended from said float system;
   d. means within said liner vessel to bubble oxygen containing gas into the water held within said liner vessel, and
   e. means to add water to and remove water from said liner vessel.

2. A floating fish growing tank comprising:
   a. a float system;
   b. a water impermeable liner suspended below said float system forming a vessel for holding water;
   c. a protective mesh around the outside of said liner, said mesh being suspended from said float system;
   d. means to maintain said liner in an expanded configuration;
   e. means within said liner vessel to bubble oxygen containing gas into the water held within said liner vessel, and
   f. means to add water to and remove water from said liner vessel.

3. The tank of claim 1 in which said bubbling means comprise:

perforated piping positionable beneath the surface of the water in said liner vessel, said perforated piping being connected to a supply of oxygen-containing gas.

4. The tank of claim 3 in which said bubbling means comprise:
perforated piping positionable beneath the surface of the water in said liner vessel, said perforated piping being connected to supply of oxygen-containing gas.

5. The tank of claim 1 in which said means for adding water comprises inlet pipes and said means for removing water comprises outlet pipes, and in which said inlet pipes are positioned opposite said outlet pipes with respect to said tank, whereby, when said means for adding and said means for removing are operated simultaneously, water is caused to circulate from said inlet to said outlet pipes.

6. The tank of claim 2 in which said means for adding water comprises inlet pipes and said means for removing water comprises outlet pipes, and in which said inlet pipes are positioned opposite said outlet pipes with respect to said tank, whereby, when said means for adding and said means for removing are operated simultaneously, water is caused to circulate from said inlet to said outlet pipes.

7. The tank of claim 3 in which said means for adding water comprises inlet pipes and said means for removing water comprises outlet pipes, and in which said inlet pipes are positioned opposite said outlet pipes with respect to said tank, whereby, when said means for adding and said means for removing are operated simultaneously, water is caused to circulate from said inlet to said outlet pipes.

8. The tank of claim 4 in which said means for adding water comprises inlet pipes and said means for removing water comprises outlet pipes, and in which said inlet pipes are positioned opposite said outlet pipes with respect to said tank, whereby, when said means for adding and said means for removing are operated simultaneously, water is caused to circulate from said inlet to said outlet pipes.

* * * * *

PO-1050
(5/69)

UNITED STATES PATENT OFFICE
CERTIFICATE OF CORRECTION

Patent No. 3,653,358               Dated April 4, 1972

Inventor(s) Howard J. Fremont

It is certified that error appears in the above-identified patent and that said Letters Patent are hereby corrected as shown below:

Claim 4, first line (col. 3, line 1) change

"3" to -- 2 -- .

Signed and sealed this 11th day of July 1972.

(SEAL)
Attest:

EDWARD M. FLETCHER, JR.　　　　　　　ROBERT GOTTSCHALK
Attesting Officer　　　　　　　　　　Commissioner of Patents